United States Patent
Starke

(10) Patent No.: US 7,566,489 B2
(45) Date of Patent: Jul. 28, 2009

(54) IMPACT-ABSORBING STRUCTURAL COMPONENT

(75) Inventor: Peter Starke, Ottobrunn (DE)

(73) Assignee: EADS Deutschland GmbH, Ottobrunn (DE)

( * ) Notice: Subject to any disclaimer, the term of this patent is extended or adjusted under 35 U.S.C. 154(b) by 751 days.

(21) Appl. No.: 11/154,470

(22) Filed: Jun. 17, 2005

(65) Prior Publication Data

US 2005/0281987 A1    Dec. 22, 2005

(30) Foreign Application Priority Data

Jun. 18, 2004    (DE) ................... 10 2004 029 485

(51) Int. Cl.
*B32B 1/00* (2006.01)
*B32B 3/28* (2006.01)
*E04C 2/32* (2006.01)
*B64D 7/00* (2006.01)
*B64C 1/00* (2006.01)

(52) U.S. Cl. .................. 428/178; 428/72; 428/182; 428/911; 244/123.12; 244/124; 244/126; 89/36.02; 89/36.11; 52/793.1

(58) Field of Classification Search ............ 428/174, 428/178, 182, 72, 911; 244/120, 123.12, 244/123.14, 124, 126; 52/783.11, 793.1, 52/789.1; 89/36.01, 36.11

See application file for complete search history.

(56) References Cited

U.S. PATENT DOCUMENTS

| 2,241,972 | A |   | 5/1941 | Wagner |
| 3,033,734 | A | * | 5/1962 | Price ........................ 156/305 |
| 3,876,492 | A | * | 4/1975 | Schott ...................... 52/789.1 |

FOREIGN PATENT DOCUMENTS

| DE | 38 24 423 A1 | 1/1990 |
| DE | 298 20 176 U1 | 5/1999 |
| DE | 101 29 576 A1 | 1/2003 |

OTHER PUBLICATIONS

German Office Action dated Sep. 12, 2005 including an English translation three (3) pages.

* cited by examiner

*Primary Examiner*—Donald Loney
(74) *Attorney, Agent, or Firm*—Crowell & Moring LLP

(57) ABSTRACT

A shock-absorbing structure component has two cover layers and an intermediate layer that is arranged between them. The intermediate layer extends in an alternating form between the cover layers, with the material of the intermediate layer being selected such that it has a higher capacity elongation prior to breaking than that of the outer cover layer. The energy of an impact can thus be absorbed as the intermediate layer is stretched into a bag shape and the inner cover layer breaks off progressively.

11 Claims, 5 Drawing Sheets

IMPACT-ABSORBING STRUCTURAL COMPONENT

BACKGROUND AND SUMMARY OF THE INVENTION

This application claims the priority of German patent document 10 2004 029 485.2, filed Jun. 18, 2004, the disclosure of which is expressly incorporated by reference herein.

The invention relates to a shock or impact absorbing structural component, in particular for ships, land vehicles and aircraft or for equipment, machines, installations and building parts.

Shock-absorbing structures are known from the prior art in which additional energy-absorbing layers are arranged in the structure. However, these layers reduce the strength of the structure, and the additional material increases its weight or requires additional space.

German patent document DE 101 29 576 discloses a structural element that has an energy-absorbing layer inserted between two cover layers, at least one of which is load-bearing. The disadvantage of this arrangement is that, whilst these layers take up shocks, it either increases in weight with the same strength, or a reduces strength. In particular, because of the arrangement of the energy-absorbing layer between the cover layers in the case of a load, a notch effect on the cover layers must be reckoned with.

In German patent document DE 101 29 576, on the other hand, dry or low-resin aramide fabric or PBO is used as the energy-absorbing layer and is connected to a load-bearing shell. As a result, tensile forces cannot be transferred transversely to the component plane, so the component is at risk in the case of certain operating loads. Moreover, the two cover layers can also bend apart when pressure forces occur in the plane of the cover shells.

Furthermore, composite structures with the thin cover layers are known from the general prior art that take up the forces in the shell plane and have a core that takes up shear forces. The core is formed from honeycombs or from foamed material which on account of the limited structural space cannot, however, take up great energies, since the absorption route is limited. Superposition of a plurality of sandwich structures is restricted inwardly and outwardly in most cases of application for reasons of space.

One object of the invention, therefore, is to provide a shock-absorbing structural component for various cases of application that presents an optimized solution in terms of weight.

This and other objects and advantages are achieved by the shock absorbent structure according to the invention, in which a shock-absorbing structural component has two cover layers with an intermediate layer arranged between them. The intermediate layer extends in an alternating or convoluted form between the cover layers, and is made of a material that exhibits a greater capacity for elongation prior to breaking than at least one of the cover layers. In particular, the intermediate layer can be formed in an undulating shape, from angular portions, trapezoidally, in the shape of nubs or indentations, or in the shape of an egg carton. It thus has a surface area larger than that of the flat or smoothly curved cover layers.

Other objects, advantages and novel features of the present invention will become apparent from the following detailed description of the invention when considered in conjunction with the accompanying drawings.

DETAILED DESCRIPTION OF THE DRAWINGS

Figure 1:
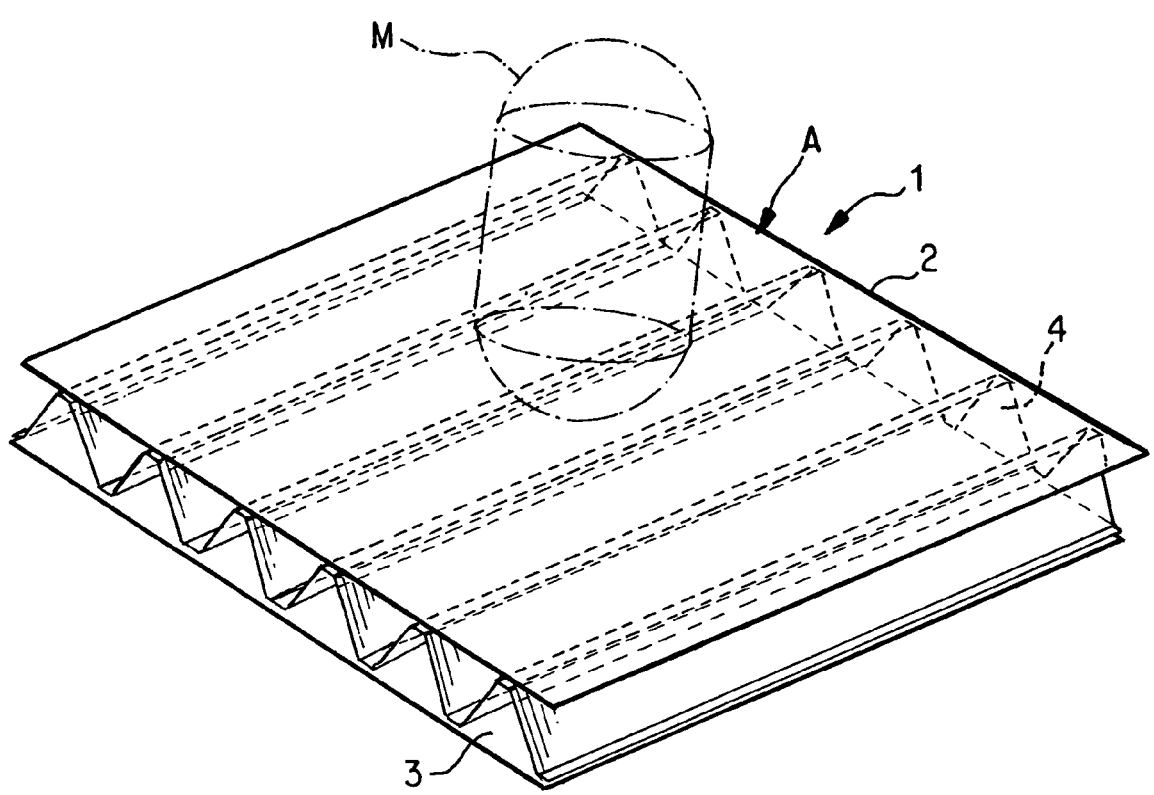
FIG. 1 is a perspective view of an embodiment of the shock-absorbing structural component according to the invention formed as a planar component, with an incident massive object being shown adjacent to it.

As shown in FIG. 1, the structural component 1 in accordance with the invention, is formed from two cover layers 2, 3 and an intermediate layer 4 that is arranged between them. The intermediate layer 4 is formed from an originally planar material that is shaped such that it extends at least in one section (A) in an alternating or convoluted form between the cover layers 2, 3. The peaks and valleys are fixed to the cover layers alternately (for instance, by welding or adhesive).

In accordance with the invention, the material of the intermediate layer 4 is selected so that it has a higher capacity for elongation prior to breaking than at least one cover layer 2 or 3. In the case where only one of the cover layers 2 or 3 has a lower elongation at break than the intermediate layer 4, the latter layer is placed on that side of the structure component 1 on which it is to perform a protective function against a shock or impact.

Figure 2:
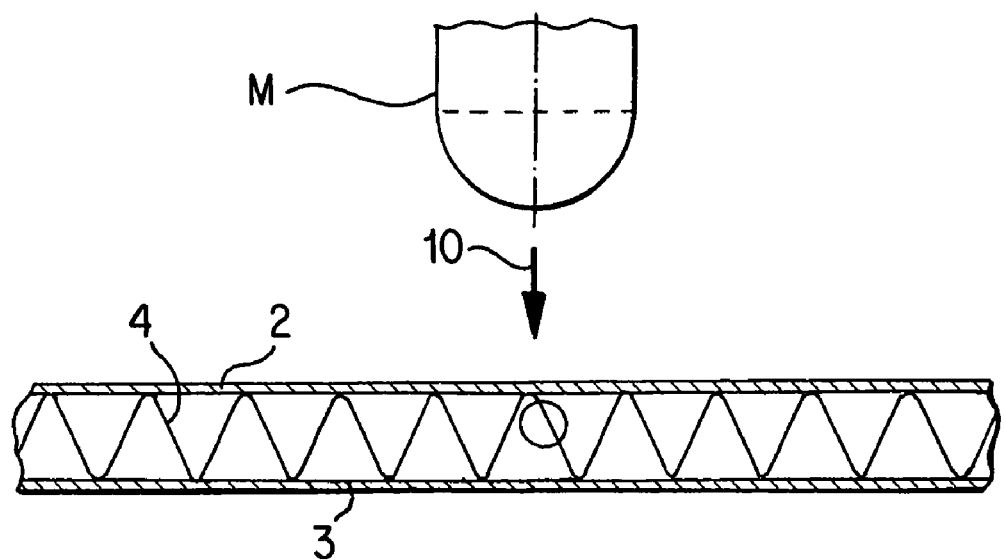
FIG. 2 is a cross-sectional view of the structural component according to FIG. 1 in its non-deformed shape, with the adjacent mass portion, before it strikes the structural component.
Figure 3:
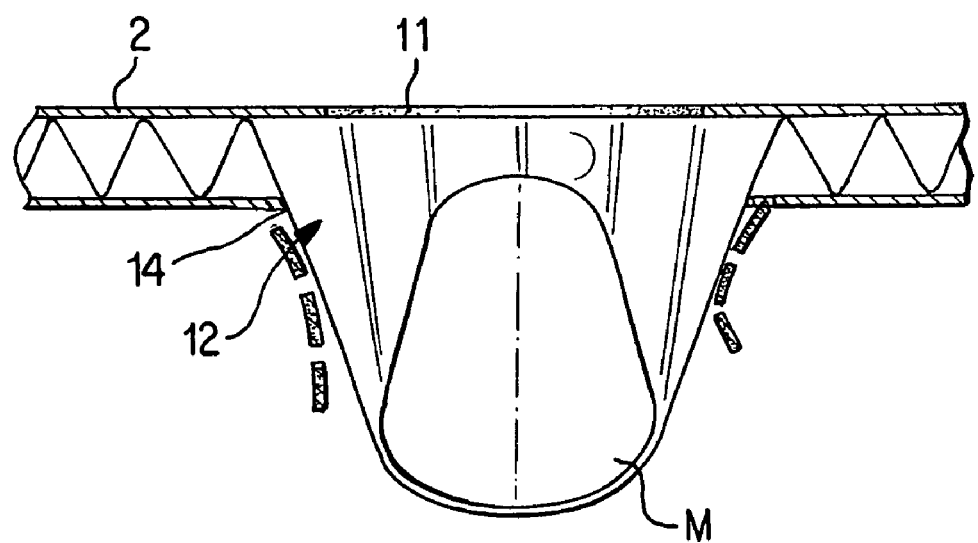
FIG. 3 is a sectional view of the structural component of FIG. 1, after the massive object has struck the structure component.
Figure 4:
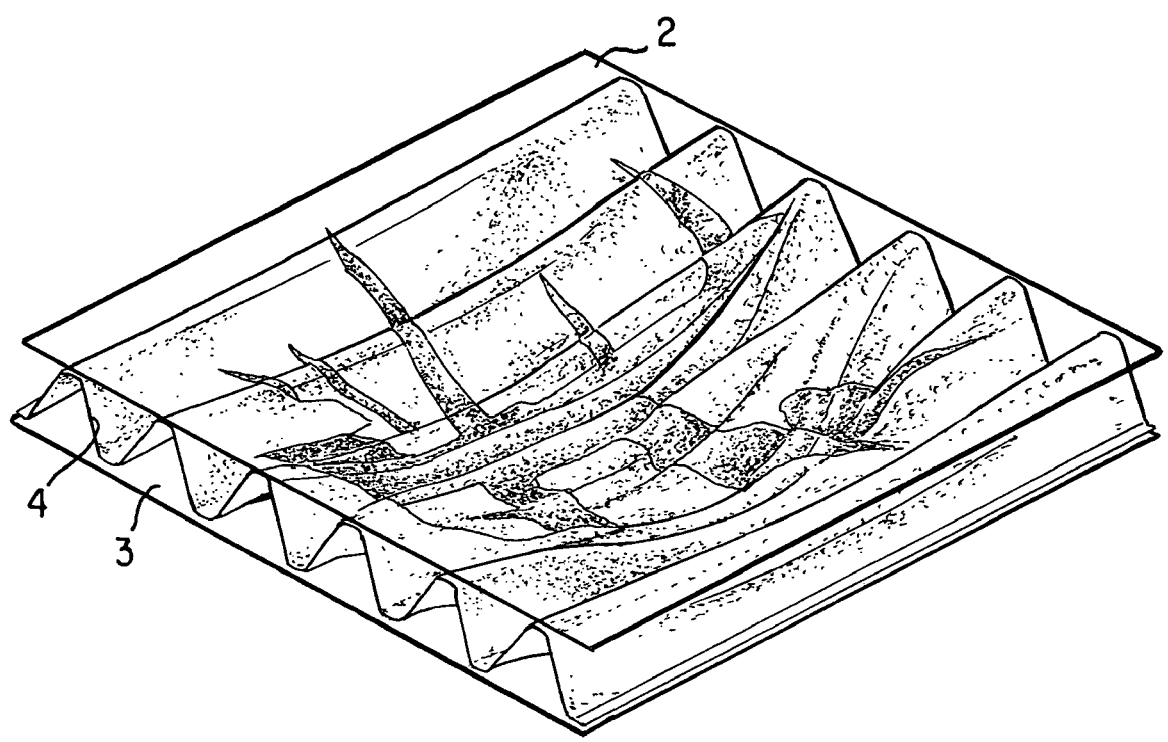
FIG. 4 is a perspective view of a deformed structural component, after an impact.
Figure 5:
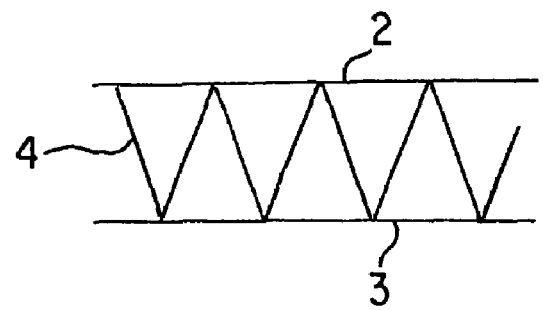
FIG. 5 is a diagrammatic sectional representation of a detail of a further embodiment of the structural component according to the invention.
Figure 6:
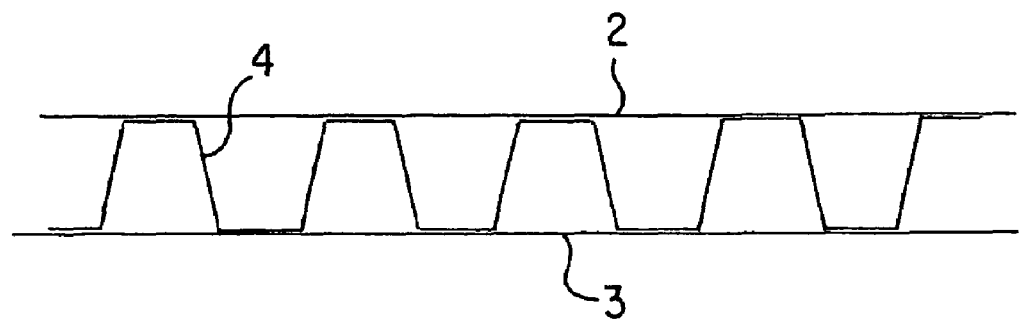
FIG. 6 is a diagrammatic sectional representation of a detail of a further embodiment of the structural component according to the invention.
Figure 7:
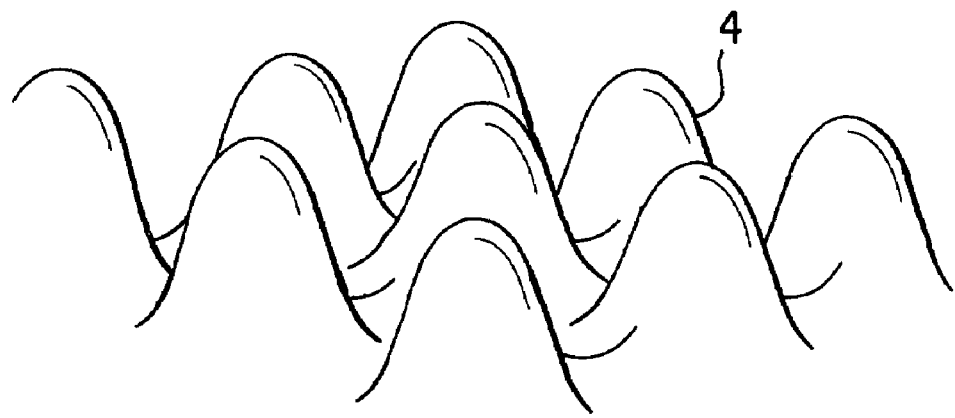
FIG. 7 is a diagrammatic perspective view of a portion of further embodiment of the invention, with the intermediate layer being formed in the shape of an egg carton.

Various configurations of the intermediate layer 4 are shown in FIGS. 2, 5, 6 and 7. In a first alternative the intermediate layer 4 can be formed in a one-dimensionally undulating shape (FIGS. 2 to 4). In a further alternative, the intermediate layer can be formed angularly, that is, with angular portions or angular elements (FIG. 5). Moreover, the intermediate layer can be formed trapezoidally (FIGS. 1 and 6), in the shape of individual nubs or projections, or even in the shape of an egg carton (FIG. 7).

As a result of the shaping of the intermediate layer 4 in accordance with the invention, during normal operation the structure component or the intermediate layer can transfer shear forces from operating loads. Moreover, due to the capability of the intermediate layer to stretch prior to breaking relative to at least one cover layer 2 or 3, when a massive object M acts on the structural component, the deceleration section is enlarged.

The massive object M is generally a three-dimensional object which may move at a considerable speed relative to the structural component 1, prior to an impact. The mass portion M may be, for example, a solid body or solid body component part with a fixed or indeterminate structure or shape. Furthermore, the mass portion might also be a quantity of a fluid (that is, of a gas or a liquid). When the component in accordance with the invention is used for an airplane, the "fluid" can, for example, be a bird, or an operational fluid such as fuel or hydraulic fluid. The fuel can then impact on the structural component from outside the airplane structure or within the same. The latter can be the case, for example, if fuel within a fuel tank impacts on the shock-absorbing structure, (which might be, for example, the tank wall) on account of movement of the airplane.

Use of the component in accordance with the invention can be advantageous in various circumstances: on the one hand when on account of the movement of the airplane in space an operational fluid located in the airplane transmits a shock to a structural component in accordance with the invention; on the other hand, when a shock is transmitted between the structural component and a fluid located outside the airplane, such as a bird or when a projectile transmits kinetic or chemical energy to a fluid located in the aeroplane.

Figure 8:
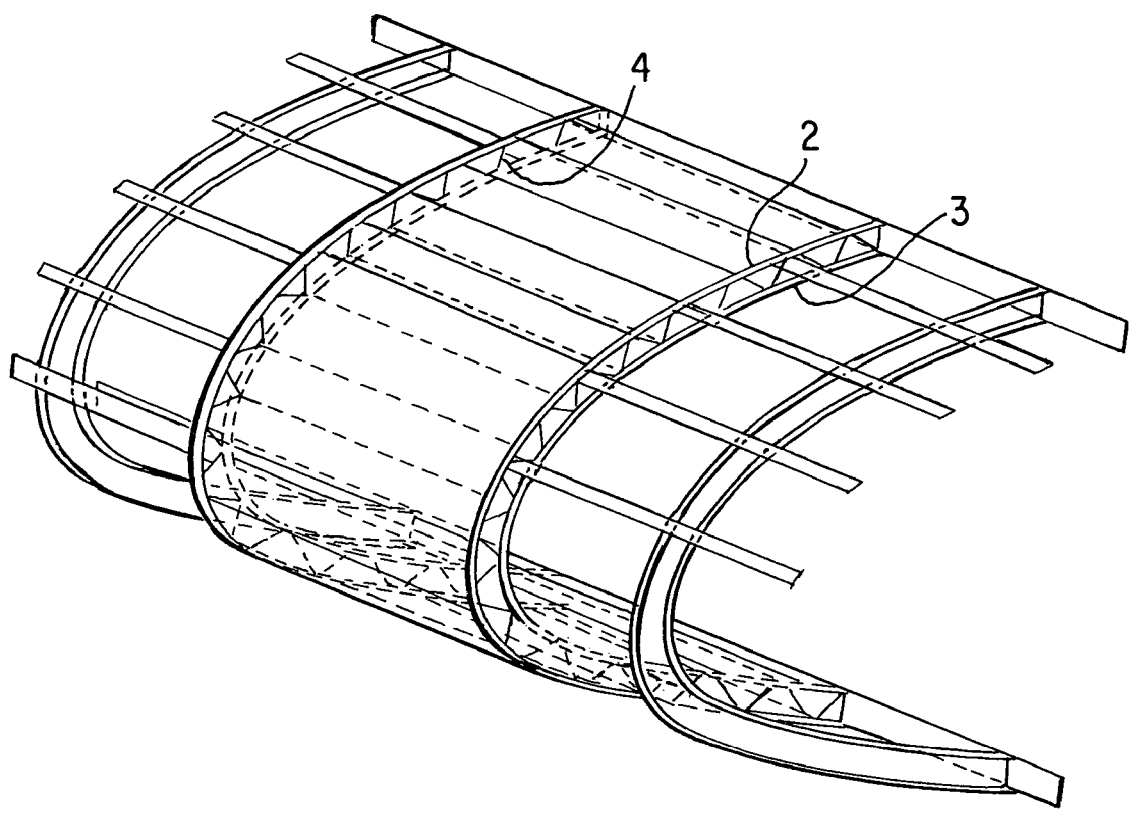
FIG. 8 is a perspective view a structural component in accordance with the invention formed as a front shell portion of an aircraft wing, and thus as a curved component.

The structural component 1 in accordance with the invention can additionally have further elements or component parts, such as, for example, reinforcing ribs or stringers. (See FIG. 8.)

The mode of operation of the structural component 1 in accordance with the invention when a massive object M strikes it will be described in the following with the aid of FIGS. 2 and 3.

It is assumed that the massive object M moves towards the structural component 1 in accordance with the invention in a direction of movement 10 (FIG. 2). The elongation at the breaking point, or breaking strain, of the cover layer that faces the approaching mass portion M is lower than that of the intermediate layer 4 and the layer facing away from the mass portion M. In FIG. 3, the cover layer facing the approaching mass portion M is indicated by reference numeral 2. This is referred to as the first or front cover layer in the following.

Upon impact of the massive object M, the elongation ability of the cover layer 2 is exceeded, and thus a portion of the kinetic energy of the mass portion M is absorbed. In, the case of an assumed maximum shock of the mass portion M, the first cover layer 2 is designed in such a way that the latter is pierced. As a result of the failure of the cover layer 2, an opening 11 is formed, and the massive object M acts on the intermediate layer 4. Because of the shape and the higher elongation capability of the intermediate layer 4 before it breaks, the latter is compressed elastically. Consequently, forces are transferred to the layer 3. The deformation is shown in three dimensions in FIG. 4.

The cover layer 3 becomes elongated, so that its breaking point may possibly be exceeded. In this case, the intermediate layer 4 is then drawn through the opening 12 forming in the resultant opening in the cover layer 3 (FIG. 3). In this case, when the connection between the cover layer 2 and the intermediate layer 4 comes undone in a controlled manner, so that a collecting sack is formed. The collecting sack loads the edges 14 of the opening 12 so that the elongation at break is continuously exceeded in the region of the opening edge 14. As a result, the opening 12 widens continuously, and such enlargement of the opening 12 together with the enlargement of the collecting sack further reduces the kinetic energy of the mass M.

For a maximum intended permitted shock of the assumed event, the shape of the component parts of the structural component according to the invention, as well as their capacity to stretch prior to breaking as the cover layers and the intermediate layer 4, permits the kinetic energy of the massive object M to be completely absorbed, or at least reduced to such an extent that, for regions or installations that lie behind the structure damage does not exceed a predetermined measure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An impact-absorbing structural component comprising:
   first and second cover layers; and
   an intermediate layer arranged between the cover layers; wherein
   said intermediate layer comprises deformable stretchable means, responsive to application of an impulse on said impact absorbing component, which impulse exceeds the capacity of at least one of said cover layers to stretch prior to breaking, for forming a collecting sack which extends through an opening in one of said cover layers and applies a load to edges of said opening so as to widen said opening while absorbing energy;
   the intermediate layer extends in an alternating form between the cover layers; and
   the intermediate layer is formed of a material that has a higher breaking strain than at least one of the cover layers.

2. The impact-absorbing structural component according to claim 1, wherein the intermediate layer has an undulating configuration.

3. The impact-absorbing structural component according to claim 1, wherein the intermediate layer comprises angular portions.

4. The impact-absorbing structural component according to claim 1, wherein the intermediate layer comprises portions having a trapezoidal cross section.

5. The impact-absorbing structural component according to claim 1, wherein the intermediate layer is formed in the shape of nubs.

6. The impact-absorbing structural component according to claim 1, wherein the intermediate layer is formed in the shape of an egg carton.

7. The aircraft part which is formed with an impact absorbing structure comprising:
   first and second cover layers; and
   an intermediate layer arranged between the cover layers; wherein
   said intermediate layer comprises deformable stretchable means, responsive to application of an impulse on said impact absorbing component, which impulse exceeds the capacity of at least one of said cover layers to stretch prior to breaking, for forming a collecting sack which extends through an opening in one of said cover layers and applies a load to edges of said opening so as to widen said opening while absorbing energy;
   the intermediate layer extends in an alternating form between the cover layers; and
   the intermediate layer is formed of a material that has a higher breaking strain than at least one of the cover layers.

8. The aircraft part according to claim 7, wherein the part comprises a wing.

9. The aircraft part according to claim 7, wherein the outer cover layer has breaking strain lower than that of the intermediate layer.

10. The aircraft part according to claim 8, wherein the outer cover layer has breaking strain lower than that of the intermediate layer.

11. An impact-absorbing component, comprising:
first and second cover layers; and
an intermediate layer arranged between the cover layers;
said intermediate layer comprises deformable stretchable means, responsive to application of an impulse on said impact absorbing component, which impulse exceeds the capacity of at least one of said cover layers to stretch prior to breaking, for forming a collecting sack which extends through an opening in one of said cover layers and applies a load to edges of said opening so as to widen said opening while absorbing energy;
wherein the intermediate layer has a three dimensional contoured configuration which couples the first and second cover layers, and is made of a material which has a greater breaking strain than a material of at least one of the cover layers.

* * * * *